(No Model.)

E. CLARK.

CURB STONE AND SIDEWALK CONDUIT FOR ELECTRIC WIRES.

No. 278,095. Patented May 22, 1883.

WITNESSES:

INVENTOR:
E. Clark
BY
ATTORNEYS.

UNITED STATES PATENT OFFICE.

EDWARD CLARK, OF JERSEY CITY, NEW JERSEY.

CURBSTONE AND SIDEWALK CONDUIT FOR ELECTRIC WIRES.

SPECIFICATION forming part of Letters Patent No. 278,095, dated May 22, 1883.

Application filed February 28, 1883. (No model.)

*To all whom it may concern:*

Be it known that I, EDWARD CLARK, of Jersey City, in the county of Hudson and State of New Jersey, have invented a new and useful Improvement in Curbstone and Sidewalk Conduits for Telegraph, Electric-Light, and Telephone Wires, of which the following is a full, clear, and exact description.

Reference is to be had to the accompanying drawings, forming part of this specification, in which similar letters of reference indicate corresponding parts in all the figures.

Figure 1:
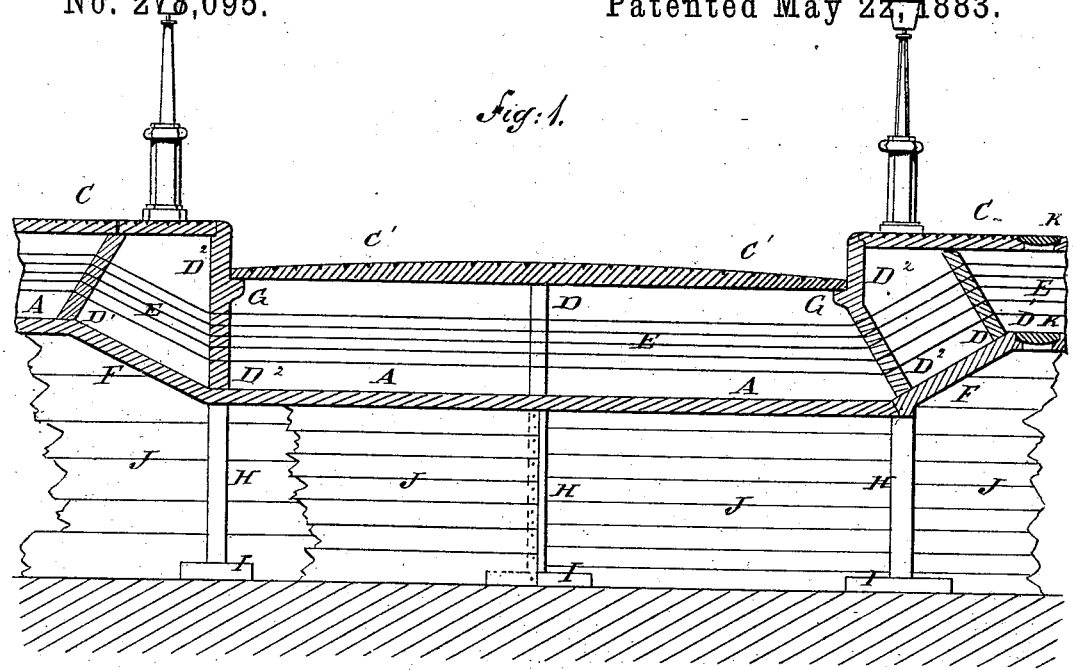
Figure 2:
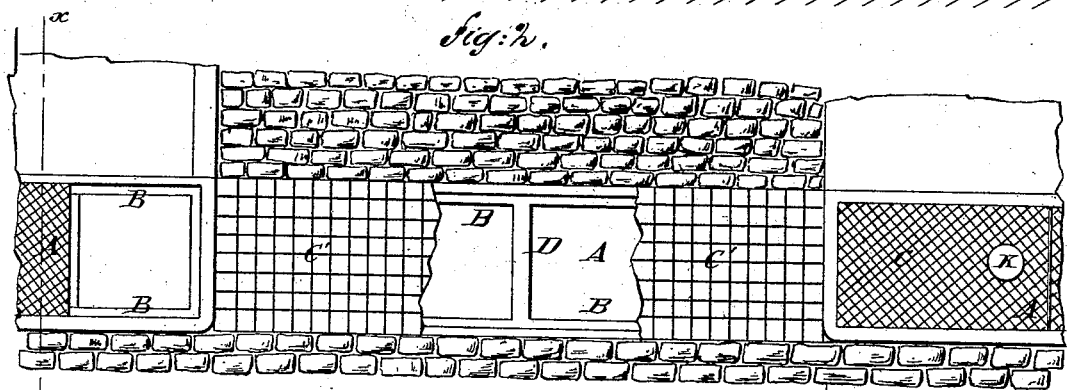
Figure 3:
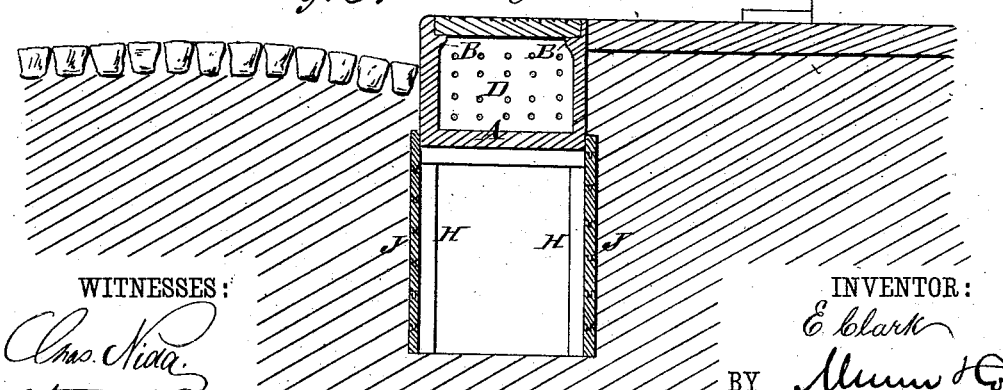

Figure 1 is a sectional side elevation of my improvement. Fig. 2 is a plan view of the same, parts being broken away. Fig. 3 is a cross-section of the same, taken through the line $x\ x$, Fig. 2.

The object of this invention is to provide convenient means for laying telegraph, electric-light, and telephone wires in streets.

A represents an open-topped iron box, which is made rectangular in form, and the outer side of which is made sufficiently strong and heavy to adapt it to serve as a curb. The inner sides of the upper edges of the sides of the box A are rabbeted, or have shoulders B formed upon them to receive and support the cover C, which is made in sections, so that any part of the said cover can be turned back or removed to give access to the interior of the said box A. If desired, the sections of the cover C can be hinged at their inner edges for convenience in opening and closing any desired part of the box A. In case the sidewalk-stones are too thick to be readily cut away, the box A is placed beneath the said stones, and doors are formed in the outer side of the said box to give access to the interior.

The box A is laid along the edge of the roadway, space being obtained by cutting away the outer part of the sidewalk, so that the outer side of the said box will serve as a curb to the street, and the cover of the box will form the outer part of the sidewalk.

The cover C is supported and the box A strengthened by cross-partitions D, placed at suitable distances apart, and which are perforated with numerous holes to receive the electric wires E, as indicated in the drawings. Some of the perforations in the partitions D may be made larger, to receive large wires or cables, when desired. The wires E are designed to be thoroughly coated with an insulating material, to prevent the electricity from escaping where the said wires come in contact with their supports.

At street-crossings the box A is made with downward offsets F, which are made inclined, as shown in Fig. 1, so that the wires E need not be bent at sharp angles, and there will be no danger of breaking the insulating-covering of the said wires. The offsets F are provided with partitions $D'\ D^2$ at the inner and outer ends. The inner partitions, $D'$, are set at an inclination, as shown in Fig. 1, and the outer partitions, $D^2$, may be inclined, as shown in the right-hand part of Fig. 1, or vertical, as shown at the left hand part of Fig. 1. The upper parts of the outer partitions, $D^2$, are vertical in either case, and form a part of the curb of the cross-street, as shown in Figs. 1 and 2.

Upon the outer sides of the outer partitions, $D^2$, at the offsets, are formed shoulders G at a distance from their upper edges equal to the height of the curb, to form seats for the part $C'$ of the cover that extends across the cross-street, as shown in Fig. 1.

The box A is supported against settling by supports A, set in the ground, and which are made of sufficient length to reach a solid foundation, and have base-blocks or feet I attached to their lower ends.

In case more electric wires are to be used than can be placed in the box A, the ground beneath the said box is excavated, and the space or chamber thus formed is inclosed by attaching boards J or other siding to the supports H. In this case supports for the wires are provided by attaching perforated partitions to the supports H.

In case the box A passes over vaults lighted through dead-lights set in the sidewalk, the said dead-lights are replaced by dead-lights K, set in the cover C and in the bottom of the said box A, as shown in Fig. 1.

The sections of the cover C, that form a part of the sidewalk, are roughened to prevent persons walking upon them from slipping, and the sections $C'$ of the cover that forms a part of the roadway are coarsely roughened to prevent horses from slipping upon them.

Having thus described my invention, what I claim as new, and desire to secure by Letters Patent, is—

1. In a conduit for electric wires, the outer partitions, D², at the offsets F, made, substantially as herein shown and described, with shoulders G, to support the ends of the cover-sections C', that form a part of the roadway, as set forth.

2. In a conduit for electric wires, the combination, with the box-supports H, of the siding J, substantially as herein shown and described, to form a chamber to receive additional wires, as set forth.

EDWARD CLARK.

Witnesses:
JAMES T. GRAHAM,
C. SEDGWICK.